(12) United States Patent
Wang et al.

(10) Patent No.: US 12,164,206 B2
(45) Date of Patent: Dec. 10, 2024

(54) TFT SUBSTRATE, LIQUID CRYSTAL DISPLAY PANEL, DISPLAY MODULE AND ELECTRONIC DEVICE

(71) Applicants: Huizhou China Star Optoelectronics Display Co., Ltd., Huizhou (CN); Shenzhen China Star Optoelectronics Semiconductor Display Technology Co., Ltd., Shenzhen (CN)

(72) Inventors: Wuhui Wang, Huizhou (CN); Mengyang Liu, Huizhou (CN)

(73) Assignees: Huizhou China Star Optoelectronics Display Co., Ltd., Huizhou (CN); Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/613,960

(22) PCT Filed: Sep. 28, 2021

(86) PCT No.: PCT/CN2021/121364
§ 371 (c)(1),
(2) Date: Nov. 24, 2021

(87) PCT Pub. No.: WO2023/044942
PCT Pub. Date: Mar. 30, 2023

(65) Prior Publication Data
US 2024/0027861 A1    Jan. 25, 2024

(30) Foreign Application Priority Data
Sep. 23, 2021    (CN) .......................... 202111114450.X

(51) Int. Cl.
G02F 1/1368    (2006.01)
G02F 1/1333    (2006.01)
(Continued)

(52) U.S. Cl.
CPC ...... *G02F 1/1368* (2013.01); *G02F 1/133302* (2021.01); *G02F 1/13338* (2013.01);
(Continued)

(58) Field of Classification Search
CPC ............ G02F 1/1368; G02F 1/133302; G02F 1/13338; G02F 1/134309; G02F 1/136222;
(Continued)

(56) References Cited

U.S. PATENT DOCUMENTS

2017/0160601 A1*  6/2017  Kang ................ H01L 29/66969
2021/0364843 A1*  11/2021  Cai ..................... G02F 1/13624

FOREIGN PATENT DOCUMENTS

CN    105759515 A    7/2016
CN    110082970 A    8/2019
(Continued)

OTHER PUBLICATIONS

KR 20170072185 translation (Year: 2017).*

*Primary Examiner* — James A Dudek
(74) *Attorney, Agent, or Firm* — Nathan & Associates; Menachem Nathan

(57) ABSTRACT

Provided area a TFT substrate, a liquid crystal display panel, a display module and an electronic device. In the TFT substrate provided by the embodiment of the present application, by arranging the preset electrode and the common electrode to be connected to the same line connector, if there is a short circuit between the preset electrode and the common electrode, it can be avoided that the voltage signal on the preset electrode being pulled down to lead the abnormal display conditions, such as vertical gradient lines on the display screen.

20 Claims, 2 Drawing Sheets

(51) Int. Cl.
  *G02F 1/13357* (2006.01)
  *G02F 1/1343* (2006.01)
  *G02F 1/1362* (2006.01)

(52) U.S. Cl.
  CPC ...... *G02F 1/1336* (2013.01); *G02F 1/134309* (2013.01); *G02F 1/136222* (2021.01); *G02F 1/136286* (2013.01); *G02F 2201/50* (2013.01)

(58) Field of Classification Search
  CPC .......... G02F 1/136286; G02F 2201/50; G02F 1/134345
  See application file for complete search history.

(56) References Cited

FOREIGN PATENT DOCUMENTS

| | | |
|---|---|---|
| CN | 110794626 A | 2/2020 |
| CN | 111208688 A | 5/2020 |
| CN | 111323956 A | 6/2020 |
| CN | 111474784 A | 7/2020 |
| CN | 113253527 A | 8/2021 |
| JP | 2009156961 A | 7/2009 |
| KR | 20210106061 A | 8/2021 |

\* cited by examiner

TFT SUBSTRATE, LIQUID CRYSTAL DISPLAY PANEL, DISPLAY MODULE AND ELECTRONIC DEVICE

FIELD OF THE INVENTION

The present application relates to a display technology field, and more particularly to a TFT substrate, a liquid crystal display panel, a display module and an electronic device.

BACKGROUND OF THE INVENTION

In the display skill field, Liquid Crystal Display (LCD), Organic Light Emitting Diode (OLED) and other panel displays have been gradually replaced the CRT displays.

Generally, the liquid crystal display comprises a shell, a LCD panel located in the shell and a backlight module located in the shell. The structure of the liquid crystal display panel mainly comprises two glass substrates and a liquid crystal layer arranged between the two glass substrates. The working principle is that the light of backlight module is reflected to generate images by applying driving voltages for controlling the rotations of the liquid crystal molecules.

In order to expand the viewing angle of the panel and increase the contrast, the existing liquid crystal display panel generally adopts a Sharebar (preset electrode) design, that is, a pixel is divided into a main pixel and a sub pixel. The voltage of the sub pixel is lowered with the Sharebar. Since there is Array com (the common electrode on the side of the array substrate) under the Sharebar, a short circuit is likely to occur between Sharebar and Array com when there are foreign objects between Sharebar and Array com. Since the voltage signal on Array com is generally lower than the voltage signal on Sharebar, when Sharebar and Array com are short-circuited, the voltage signal on Sharebar will be pulled down in general, which will cause abnormal display conditions, such as vertical gradient lines on the liquid crystal display panel.

SUMMARY OF THE INVENTION

The embodiment of the present application provides a TFT (Thin Film Transistor) substrate, a liquid crystal display panel, a display module and an electronic device to solve the problem of abnormal display when the common electrode and the preset electrode are short-circuited.

First, the embodiment of the present application provides a TFT (Thin Film Transistor) substrate, wherein an active area of the TFT substrate is provided with a plurality of pixels, and the pixel comprises a main pixel area and a sub pixel area;

the main pixel area is provided with a first transistor, and the sub pixel area is provided with a second transistor, a third transistor and a preset electrode, and a source of the third transistor is connected to a drain of the second transistor, and a drain of the third transistor is connected to the preset electrode;

the TFT substrate further comprises a common electrode and a line connector, and the common electrode is arranged corresponding to the plurality of the pixels, and the preset electrode and the common electrode are both connected to the line connector, and the line connector is employed to apply a same voltage signal to the preset electrode and the common electrode.

In some embodiment, a first line, a second line and a third line are provided among the line connector, the preset electrode and the common electrode, and the first line has a first end and a second end that are opposed to each other, the second line has a third end and a fourth end that are opposed to each other, and the third line has a fifth end and a sixth end that are opposed to each other;

the first end of the first line is connected to the line connector, and the third end of the second line is connected to the preset electrode, and the fifth end of the third line is connected to the common electrode, and the second end of the first line, the fourth end of the second line and the sixth end of the third line are connected together.

In some embodiment, the TFT substrate comprises a base substrate, a first metal layer, a first insulating layer, a semiconductor layer, a second metal layer and a second insulating layer that are stacked in sequence; wherein the first metal layer comprises a gate and the common electrode that area spaced apart; the second metal layer comprises a source, a drain and the preset electrode.

In some embodiment, the semiconductor layer comprises a channel region, and a source contact region and a drain contact region respectively located on both sides of the channel region, and the channel region comprises an amorphous silicon layer, and both the source contact region and the drain contact region comprise the amorphous silicon layer and an N-type doped amorphous silicon layer that are stacked.

In some embodiment, the TFT substrate further comprises a color filter layer arranged at a side of the second insulating layer away from the second metal layer and a protective layer arranged at a side of the color filter layer away from the second insulating layer.

In some embodiment, a material of the protective layer comprises soluble polytetrafluoroethylene.

Second, the embodiment of the present application provides a liquid crystal display panel, comprising a TFT substrate and a first substrate that are oppositely arranged, and a liquid crystal layer arranged between the TFT substrate and the first substrate, wherein the TFT substrate is the aforesaid TFT substrate.

Third, the embodiment of the present application provides a display module. The display module comprises the aforesaid liquid crystal display panel.

In some embodiments, the display module further comprises a touch control screen, and the touch screen is stacked with the liquid crystal display panel.

Fourth, the embodiment of the present application provides an electronic device. The electronic device comprises the aforesaid display module.

In the TFT substrate provided by the embodiment of the present application, by arranging the preset electrode and the common electrode to be connected to the same line connector, the external power supply can input the same voltage signal to the preset electrode and the common electrode via the line connector. Under such circumstance, even if there is a short circuit between the preset electrode and the common electrode, the voltage signal on the preset electrode and the voltage signal on the common electrode will remain the same. Therefore, abnormal display conditions, such as vertical gradient lines on the display screen caused by the voltage signal on the preset electrode being pulled down can be avoided. Besides, by arranging the preset electrode and the common electrode to be connected to the same line connector, compared with the prior art, it can also reduce the total wiring design required for the voltage signal input of the preset electrode and the voltage signal input of the common electrode. It is beneficial to reduce the production cost of the TFT substrate and increase the production capacity. Meanwhile, because the peripheral wiring of the TFT substrate is reduced, the probability of defective peripheral circuits can also be reduced, which is beneficial to improve the production yield of the TFT substrate.

BRIEF DESCRIPTION OF THE DRAWINGS

In order to more clearly illustrate the embodiments of the present application, the following figures will be described in the embodiments are briefly introduced. It is obvious that the drawings are merely some embodiments of the present application, those of ordinary skill in this field can obtain other figures according to these figures without paying the premise.

In order to have a more complete understanding of the present application and its beneficial effects, the description will be given below in conjunction with the accompanying drawings. In the following description, the same reference numerals indicate the same parts.

DETAILED DESCRIPTION OF PREFERRED EMBODIMENTS

For better explaining the technical solution and the effect of the present invention, the present invention will be further described in detail with the accompanying drawings in the specific embodiments. It is clear that the described embodiments are merely part of embodiments of the present application, but not all embodiments. Based on the embodiments of the present application, all other embodiments to those of ordinary skill in the premise of no creative efforts obtained, should all be considered within the scope of protection of the present application.

Figure 1:
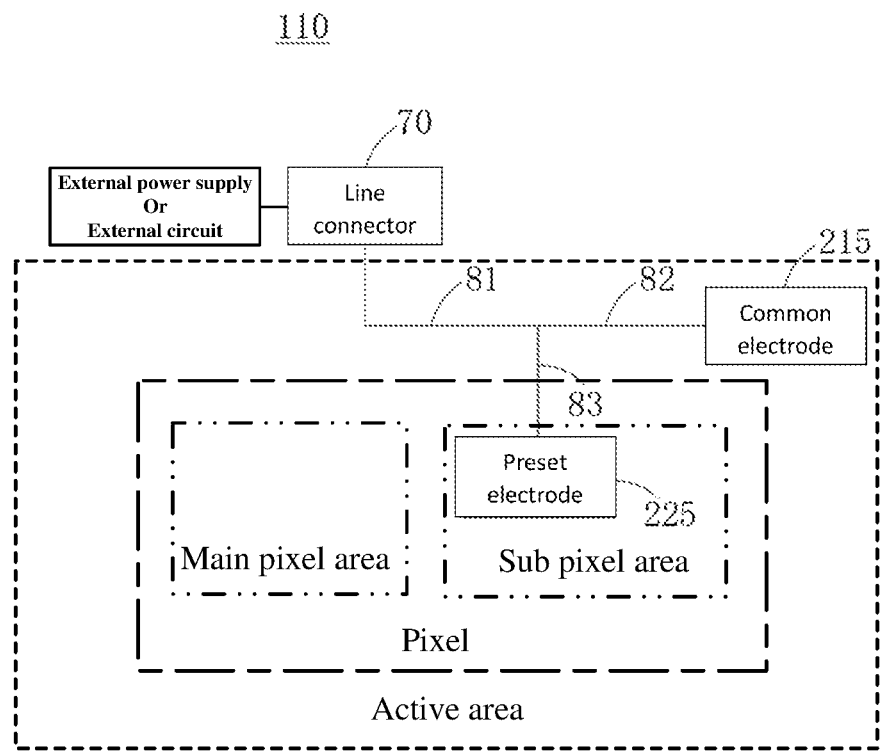
FIG. 1 is a connection diagram of a partial structure in the TFT substrate provided by an embodiment of the application.
Figure 2:
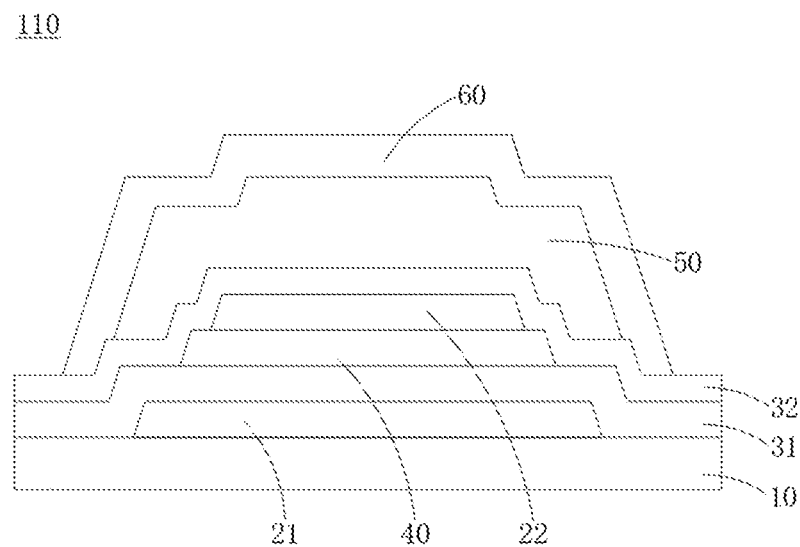
FIG. 2 is a cross-sectional structure diagram of a TFT substrate provided by an embodiment of the application.

Please refer to FIG. 1 and FIG. 2. FIG. 1 is a connection diagram of a partial structure in the TFT substrate provided by an embodiment of the application. FIG. 2 is a cross-sectional structure diagram of a TFT substrate provided by an embodiment of the application. The embodiment of the present application provides a TFT (Thin Film Transistor) substrate 110. An active area of the TFT substrate 110 is provided with a plurality of pixels, and the pixel comprises a main pixel area and a sub pixel area.

The main pixel area is provided with a first transistor, and the sub pixel area is provided with a second transistor, a third transistor and a preset electrode (Sharebar) 225, and a source of the third transistor is connected to a drain of the second transistor, and a drain of the third transistor is connected to the preset electrode 225. It can be understood that by arranging the third transistor in the sub pixel area, part of the voltage of the sub pixel area is released to the preset electrode 225, so as to realize that the voltages of the main pixel area and the sub pixel area are different, thus the main pixel area and the sub pixel area are different. Accordingly, the difference in the rotation angles of the liquid crystal molecules is occurred between the main pixel area and the sub pixel area to improve the viewing angle and increase the contrast. Illustratively, in one pixel, the voltage signal of the main pixel area is higher than the voltage signal of the sub pixel area. Therefore, when the TFT substrate 110 is applied to the liquid crystal display panel 100, the brightness of the sub pixel area is less than that of the main pixel area.

With FIG. 1, the TFT substrate 110 further comprises a common electrode (Array com) 215 and a line connector 70. The common electrode 215 is arranged to correspond to the plurality of pixels. The preset electrode 225 and the common electrode 215 are both connected to the line connector 70. The line connector 70 is employed to apply the same voltage signal to the preset electrode 225 and the common electrode 215.

It is understandable that the line connector 70 can be employed to connect an external power supply or an external circuit. The external power supply or the external circuit can input the voltage signal to the line connector 70, so that the voltage signal can transmitted to the preset electrode 225 and the common electrode 215 via the line connector 70.

It is understandable that the TFT substrate 110 comprises the active area and a non-display area, and the line connector 70 is arranged in the non-display area. Therefore, a portion of the connecting lines between the line connector 70, the preset electrode 225 and the common electrode 215 is located in the non-display area, that is, belongs to a part of the peripheral wirings.

Illustratively, the line connector 70 may be a metal sheet or a metal block. In some embodiments, a material of the line connector 70 comprises one or more of molybdenum (Mo), aluminum (Al), copper (Cu), titanium (Ti), tungsten (W), chromium (Cr) and nickel (Ni).

It can be understood that pixel electrodes (not shown) are further provided on the TFT substrate 110. There is a voltage difference between the pixel electrode and the common electrode 215, and the voltage difference is employed to drive the liquid crystal molecules to rotate.

In the TFT substrate 110 provided by the embodiment of the present application, by arranging the preset electrode 225 and the common electrode 215 to be connected to the same line connector 70, the external power supply can input the same voltage signal to the preset electrode 225 and the common electrode 215 via the line connector 70. Under such circumstance, even if there is a short circuit between the preset electrode 225 and the common electrode 215, the voltage signal on the preset electrode 225 and the voltage signal on the common electrode 215 will remain the same. Therefore, abnormal display conditions, such as vertical gradient lines on the display screen caused by the voltage signal on the preset electrode 225 being pulled down can be avoided. Besides, by arranging the preset electrode 225 and the common electrode 215 to be connected to the same line connector 70, compared with the prior art, it can also reduce the total wiring design required for the voltage signal input of the preset electrode 225 and the voltage signal input of the common electrode 215. It is beneficial to reduce the production cost of the TFT substrate 110 and increase the production capacity. Meanwhile, because the peripheral wiring of the TFT substrate 110 is reduced, the probability of defective peripheral circuits can also be reduced, which is beneficial to improve the production yield of the TFT substrate 110.

With FIG. 1, a first line 81, a second line 82 and a third line 83 are provided among the line connector 70, the preset electrode 225 and the common electrode 215, and the first line 81 has a first end and a second end that are opposed to each other, the second line 82 has a third end and a fourth end that are opposed to each other, and the third line 83 has a fifth end and a sixth end that are opposed to each other;

the first end of the first line 81 is connected to the line connector 70, and the third end of the second line 82 is connected to the preset electrode 225, and the fifth end of the third line 83 is connected to the common electrode 215, and the second end of the first line 81, the fourth end of the second line 82 and the sixth end of the third line 83 are connected together.

With FIG. 2, the TFT substrate 110 comprises a base substrate 10, a first metal layer 21, a first insulating layer 31, a semiconductor layer 40, a second metal layer 22 and a second insulating layer 32 that are stacked in sequence; wherein the first metal layer 21 comprises a gate and the common electrode 215 that area spaced apart; the second metal layer 22 comprises a source, a drain and the preset electrode 225.

Illustratively, the plurality of pixels may be arranged in an array, and the preset electrodes 225 provided in each column of pixels may be connected together, or the preset electrodes 225 provided in each row of pixels may be connected together.

Illustratively, the base substrate 10 can be a glass substrate.

Illustratively, a material of the first metal layer 21 comprises one or more of molybdenum (Mo), aluminum (Al), copper (Cu), titanium (Ti), tungsten (W), chromium (Cr) and nickel (Ni).

Illustratively, a material of the first insulating layer 31 comprises one or more of silicon oxide (SiOx) and silicon nitride (SiNx).

Illustratively, a material of the second metal layer 22 comprises one or more of molybdenum (Mo), aluminum (Al), copper (Cu), titanium (Ti), tungsten (W), chromium (Cr) and nickel (Ni).

Illustratively, a material of the second insulating layer 32 comprises one or more of silicon oxide (SiOx) and silicon nitride (SiNx).

Illustratively, the semiconductor layer 40 comprises a channel region, and a source contact region and a drain contact region respectively located on both sides of the channel region, and the channel region comprises an amorphous silicon (a-Si) layer, and both the source contact region and the drain contact region comprise the amorphous silicon layer and an N-type doped amorphous silicon layer that are stacked. It can be understood that N-type doping refers to doping amorphous silicon with pentavalent elements, such as phosphorus and arsenic.

With FIG. 2, the TFT substrate 110 further comprises a color filter layer 50 arranged at a side of the second insulating layer 32 away from the second metal layer 22 and a protective layer 60 arranged at a side of the color filter layer 50 away from the second insulating layer 32.

Illustratively, the color filter layer 50 may comprise a red filter, a green filter and a blue filter. After the white backlight passes through the red filter, the green filter and the blue filter, the red light, green light and blue light formed after being mixed in different proportions and strengths can produce kinds of color variations.

Illustratively, a material of the protective layer 60 comprises soluble polytetrafluoroethylene (PFA). The protective layer 60 can protect the color filter layer 50 and other structural layers inside the TFT substrate 110.

In some embodiments, the line connector 70 may be arranged on the surface of the non-display area of the base substrate 10. For instance, the line connector 70 may be arranged on the surface of the base substrate 10 on the side where the TFT device is provided.

Figure 3:
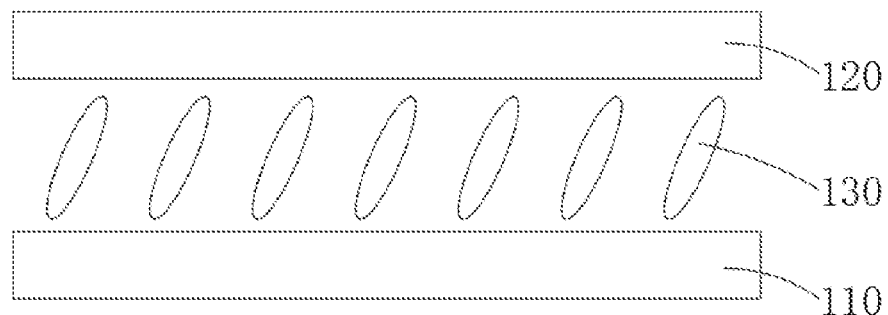
FIG. 3 is a cross-sectional structure diagram of a liquid crystal display panel provided by an embodiment of the application.

Please refer to FIG. 3. FIG. 3 is a cross-sectional structure diagram of a liquid crystal display panel provided by an embodiment of the application. The embodiment of the present application further provides a liquid crystal display panel 100. The liquid crystal display panel 100 may comprise a TFT substrate 110 and a first substrate 120 that are oppositely arranged, and a liquid crystal layer 130 arranged between the TFT substrate 110 and the first substrate 120. The TFT substrate 110 can be the TFT substrate 110 in any of the aforesaid embodiments.

Illustratively, the first substrate 120 can be a glass substrate.

Figure 4:
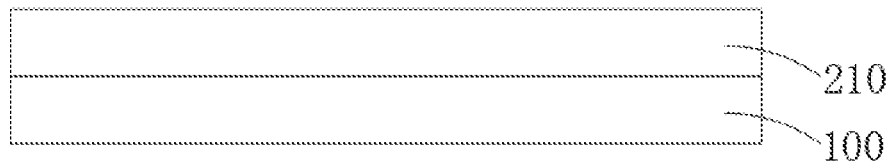
FIG. 4 is a cross-sectional structure diagram of a display module provided by an embodiment of the application.

Please refer to FIG. 4. FIG. 4 is a cross-sectional structure diagram of a display module provided by an embodiment of the application. The embodiment of the present application further provides a display module 200. The display module 200 can comprises the liquid crystal display panel 100 in any of the aforesaid embodiments.

The display module 200 can further comprise a touch control screen 210, and the touch screen 210 is stacked with the liquid crystal display panel 100.

Illustratively, the touch control screen 210 can be arranged at a side of a light emitting surface of the liquid crystal display panel 100. The touch control screen 210 can be employed to detect touch information, and to convert the touch information into contact coordinates, and to transmit it to a CPU (central processing unit), and meanwhile can receive and execute commands from the CPU.

Illustratively, the display module 200 can further comprise a backlight module, and the backlight module can be arranged at a side of a light emitting surface of the liquid crystal display panel 100.

The embodiment of the present application further provides an electronic device. The electronic device can comprise the display module 200 in any of the aforesaid embodiments.

Illustratively, the electronic devices can be televisions, mobile phones, tablet computers, desktop computers, gaming equipments, augmented reality (AR) equipments, virtual reality (Virtual Reality, VR) equipments, data storage devices, audio playback devices, video playback devices, wearable devices and other devices with display screens. The wearable devices may be smart bracelets, smart glasses, smart watches, smart decorations, etc.

The TFT substrate, the liquid crystal display panel, the display module and the electronic device provided by the embodiments of the present application are described in detail as aforementioned. The principles and implementations of the present application are described in the specific examples. The description of the above embodiments is only for helping to understand the present application. Meanwhile, those skilled in the art will be able to change the specific embodiments and the scope of the application according to the idea of the present application. In conclusion, the content of the specification should not be construed as limiting the present application.

What is claimed is:

1. A TFT (Thin Film Transistor) substrate, wherein an active area of the TFT substrate is provided with a plurality of pixels, and the pixel comprises a main pixel area and a sub pixel area;

a preset electrode;

the TFT substrate further comprises a common electrode and a line connector, and the common electrode is arranged corresponding to the plurality of the pixels, and the preset electrode and the common electrode are both connected to the line connector, and the line connector is employed to apply a same voltage signal to the preset electrode and the common electrode;

wherein the line connector is an external power source connector configured to be connected to an external power supply or an external circuit and transmit the same voltage signal from the external power supply or the external circuit to the preset electrode and the common electrode;

wherein the preset electrode and the common electrode are formed in different metal layers.

2. The TFT substrate according to claim 1, wherein a first line, a second line and a third line are provided among the line connector, the preset electrode and the common electrode, and the first line has a first end and a second end that are opposed to each other, the second line has a third end and a fourth end that are opposed to each other, and the third line has a fifth end and a sixth end that are opposed to each other;

the first end of the first line is connected to the line connector, and the third end of the second line is connected to the common electrode, and the fifth end of the third line is connected to the preset electrode, and the second end of the first line, the fourth end of the second line and the sixth end of the third line are connected together.

3. The TFT substrate according to claim 1, wherein the TFT substrate comprises a base substrate, a first metal layer, a first insulating layer, a semiconductor layer, a second metal layer and a second insulating layer that are stacked in sequence; wherein the first metal layer comprises a gate and the common electrode that area spaced apart; the second metal layer comprises a source, a drain and the preset electrode.

4. The TFT substrate according to claim 3, wherein the semiconductor layer comprises a channel region, and a source contact region and a drain contact region respectively located on both sides of the channel region, and the channel region comprises an amorphous silicon layer, and both the source contact region and the drain contact region comprise the amorphous silicon layer and an N-type doped amorphous silicon layer that are stacked.

5. The TFT substrate according to claim 3, wherein the TFT substrate further comprises a color filter layer arranged at a side of the second insulating layer away from the second metal layer and a protective layer arranged at a side of the color filter layer away from the second insulating layer.

6. The TFT substrate according to claim 5, wherein a material of the protective layer comprises soluble polytetrafluoroethylene.

7. The TFT substrate according to claim 1, wherein the TFT substrate comprises the active area and a non-display area, and the line connector is arranged in the non-display area.

8. The TFT substrate according to claim 3, wherein the base substrate is a glass substrate.

9. The TFT substrate according to claim 3, wherein a material of the first metal layer comprises one or more of molybdenum, aluminum, copper, titanium, tungsten, chromium and nickel.

10. The TFT substrate according to claim 3, wherein a material of the first insulating layer comprises one or more of silicon oxide and silicon nitride.

11. The TFT substrate according to claim 3, wherein a material of the second metal layer comprises one or more of molybdenum, aluminum, copper, titanium, tungsten, chromium and nickel.

12. The TFT substrate according to claim 3, wherein a material of the second insulating layer comprises one or more of silicon oxide and silicon nitride.

13. The TFT substrate according to claim 3, wherein the semiconductor layer comprises a channel region, and a source contact region and a drain contact region respectively located on both sides of the channel region, and the channel region comprises an amorphous silicon layer, and both the source contact region and the drain contact region comprise the amorphous silicon layer and an N-type doped amorphous silicon layer that are stacked.

14. A liquid crystal display panel, comprising a TFT substrate and a first substrate that are oppositely arranged, and a liquid crystal layer arranged between the TFT substrate and the first substrate, wherein the TFT substrate is the TFT substrate according to claim 1.

15. The liquid crystal display panel according to claim 14, wherein the first substrate is a glass substrate.

16. A display module, comprising the liquid crystal display panel according to claim 14.

17. The display module according to claim 16, further comprising a touch control screen, and the touch screen is stacked with the liquid crystal display panel.

18. The display module according to claim 17, wherein the touch control screen is arranged at a side of a light emitting surface of the liquid crystal display panel.

19. The display module according to claim 16, wherein the display module further comprises a backlight module, and the backlight module is arranged at a side of a light emitting surface of the liquid crystal display panel.

20. An electronic device, comprising the display module according to claim 16.

* * * * *